United States Patent
Na et al.

(10) Patent No.: US 8,792,773 B2
(45) Date of Patent: Jul. 29, 2014

(54) DIGITAL VIDEO MANAGING AND SEARCHING SYSTEM

(75) Inventors: Sang Il Na, Seoul (KR); Weon Geun Oh, Daejeon (KR); Hyuk Jeong, Deajeon (KR); Keun Dong Lee, Daejeon (KR); Sung Kwan Je, Daejeon (KR); Dong Seok Jeong, Seoul (KR); Ju Kyong Jin, Incheon (KR); Seon Tae Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 579 days.

(21) Appl. No.: 12/971,122

(22) Filed: Dec. 17, 2010

(65) Prior Publication Data

US 2011/0150423 A1   Jun. 23, 2011

(30) Foreign Application Priority Data

Dec. 18, 2009 (KR) .......... 10-2009-0127536
Jun. 1, 2010 (KR) .......... 10-2010-0052026

(51) Int. Cl.
*H04N 9/80* (2006.01)

(52) U.S. Cl.
USPC .......................................... 386/248

(58) Field of Classification Search
None
See application file for complete search history.

(56) References Cited

U.S. PATENT DOCUMENTS

| | | | |
|---|---|---|---|
| 7,356,830 B1* | 4/2008 | Dimitrova | 725/51 |
| 2010/0049711 A1* | 2/2010 | Singh et al. | 707/6 |
| 2010/0182401 A1 | 7/2010 | Yoon et al. | |

FOREIGN PATENT DOCUMENTS

KR   10-2008-0111376   12/2008

* cited by examiner

*Primary Examiner* — Heather Jones
(74) *Attorney, Agent, or Firm* — Staas & Halsey LLP

(57) ABSTRACT

A system for managing and searching for a digital video includes: a video feature point extraction unit decoding an input video and extracting a feature point; a video feature point database (DB) storing and managing a feature point of a video to be compared (i.e., a comparison target video), and a video feature point comparison unit coarsely comparing the feature point of the input video and that of the comparison target video to acquire a candidate group, and minutely comparing the candidate group to detect a content repeated section, and informing a user of the content repeated section.

2 Claims, 6 Drawing Sheets

| Frame Number | Extracted Index |
|---|---|
| 0 | 01001101 |
| 1 | 00000001 |
| 2 | 11111110 |
| ⋮ | ⋮ |
| N−1 | 00000010 |
| N | 11111111 |

| Index Value | Appearance Positon |
|---|---|
| 00000000 | |
| 00000001 | 1, |
| 00000010 | N−1, |
| ⋮ | ⋮ |
| 11111110 | 2, |
| 11111111 | N, |

| C(S0) | F_1 | F_2 | C(S3) | F_1 | C(S4) | F_1 | F_2 | F_3 | F_4 | ... |

# DIGITAL VIDEO MANAGING AND SEARCHING SYSTEM

CROSS-REFERENCE TO RELATED APPLICATIONS

This application claims the priority of Korean Patent Application Nos. 10-2009-0127536 filed on Dec. 18, 2009, and 10-2010-0052026 filed on Jun. 1, 2010 in the Korean Intellectual Property Office, the disclosures of which are incorporated herein by reference.

BACKGROUND OF THE INVENTION

1. Field of the Invention

The present invention relates to a digital video managing and searching system and, more particularly, to a digital video managing and searching system capable of comparatively searching two digital videos to quickly and accurately detect a section in which the same content is present.

The present invention is derived from research conducted as a part of IT growth power industrial technology development work supported by the IT R&D program of MIC/IITA and the Knowledge Economics Department [Project Management No.: 2008-S-024-02, Project title: Development of Rich UCC Technology (associated with Standardization)].

2. Description of the Related Art

Recently, the remarkable advancement of networks has enabled various multimedia contents to be easily written, produced, processed, and distributed by using the Internet, or the like.

Thus, a digital video management system, including a recognition technique for finding out information regarding coded digital media whose source and information cannot be discovered by a prior (or conventional) technique, a search technique for searching for a video whose content is the same as another's and partially repeated, a technique for managing and searching for videos broadcast through various mediums and videos spreading on the huge network, such as the Internet, and the like, and effectively managing and searching for digital videos is required for various multimedia services.

However, the related art digital video management and searching system has a problem in that it cannot smoothly manage and search for video for various reasons such as various sizes and standards of digital videos, intentional or unintentional modifications, or the like. Also, most of the conventional methods trust and use information such as a frame rate, and the like, stored in digital mediums, such that when such information is modified, managing and searching are not possible (namely, managing and searching cannot be performed).

In addition, the related art digital video management and searching system performs searching by using the values of digital videos themselves. Thus, when two digital videos are comparatively searched to acquire a content repeated section, a large search capacity and a great deal of time are required. In addition, search accuracy is degraded, making it difficult to detect a very short section of repeated content.

SUMMARY OF THE INVENTION

An aspect of the present invention provides a digital video management and searching system capable of comparatively searching two digital videos to acquire a content repeated section by using a feature point of a digital video, rather than a value of the digital video itself, to thereby reduce a search capacity and time and improve search accuracy.

Another aspect of the present invention provides a digital video management and searching system capable of managing and searching for a digital video regardless of various sizes and standard differences of digital videos, the presence of intentional or unintentional modification, and the like.

According to an aspect of the present invention, there is provided a system for managing and searching for a digital video, including: a video feature point extraction unit decoding an input video and extracting a feature point; a video feature point database (DB) storing and managing a feature point of a video to be compared (i.e., a comparison target video), and a video feature point comparison unit coarsely comparing the feature point of the input video and that of the comparison target video to acquire a candidate group, and minutely comparing the candidate group to detect a content repeated section, and informing a user of the content repeated section.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
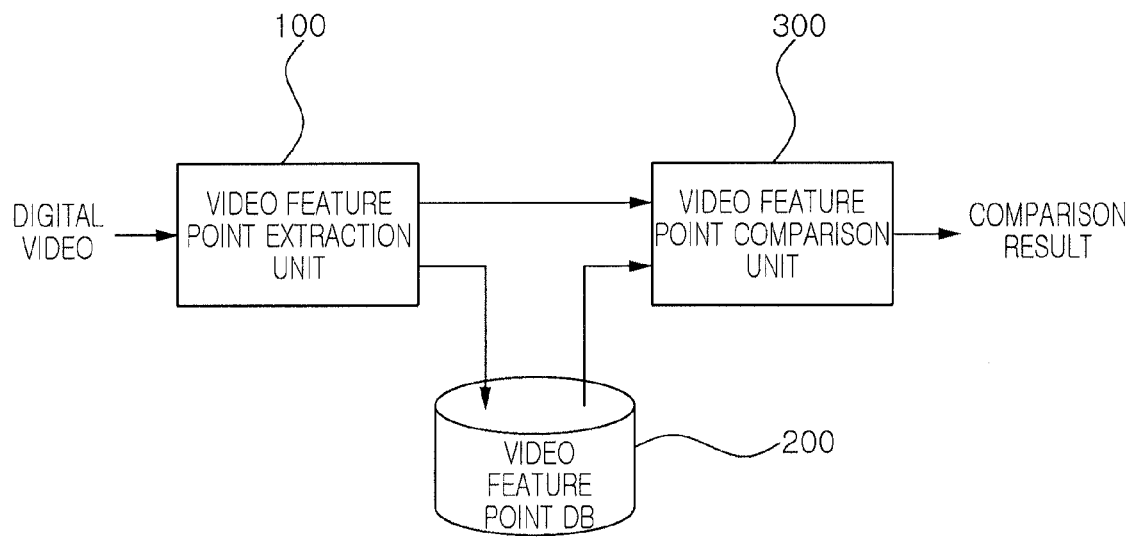
FIG. 1 is a schematic block diagram of a digital video managing and searching system according to an exemplary embodiment of the present invention.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context in which it is used. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more further features, numbers, operations, actions, components, parts, or combinations thereof may exist or may be added.

Unless otherwise defined, all terms used herein, including technical or scientific terms, have the same meanings as those generally understood by those having an ordinary knowledge in the field of the art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

FIG. 1 is a schematic block diagram of a digital video managing and searching system according to an exemplary embodiment of the present invention.

With reference to FIG. 1, a digital video managing and searching system according to an exemplary embodiment of the present invention includes a video feature point extractor 100, a video feature point database (DB) 200, a video feature point comparator 300. The according to an exemplary embodiment of the present invention may comparatively search two digital videos based on feature points of the digital videos and acquire a section having repeated content in the two digital videos.

The digital video managing and searching system may receive digital videos having various formats and sizes. The various formats refer to video files coded according to various compression schemes, and the various sizes may refer to a frame rate, a bit rate, and the like, as well as to the width and length of a digital video. Also, the digital video managing and searching system may receive a digital video intentionally or unintentionally modified into various forms. Typical modifications may include subtitles, logo insertion, a change in an image ratio, a capture, and the like.

The video feature point extractor 100 decodes input video to acquire a video frame. The video feature point extractor 100 extracts a feature point from the video frame in the form in which it was before it was compressed.

When the video feature point extractor 100 completely extracts feature points of the input video, the video feature point comparator 300 searches the video feature point DB 200 to acquire feature points of a video which may be a target to be compared with the input video. The video feature point comparator 300 then coarsely compares feature points of the input video with those of the comparison target video to acquire a candidate group and then performs fine comparing on the candidate group to detect a section in which content is repeated (namely, a section having the same content), and informs a user. Namely, the section of the comparison target video storing the same content as that of the input video can be detected and informed. Also, conversely, the section of the input video storing the same content as that of the comparison target video may be detected and informed.

The video feature point DB 200 may be implemented as various DB management systems (DBMS), performing the function of previously storing and managing feature points of the video to be compared (i.e., comparison target video) of video to be input (i.e., input video) to the digital video managing and searching system. For reference, the feature points of the comparison target video are stored before the input video is input. Also, like the input video, the feature points of the comparison target video may be extracted by the video feature point extractor 100 and then stored in the video feature point DB 200.

Figure 2:
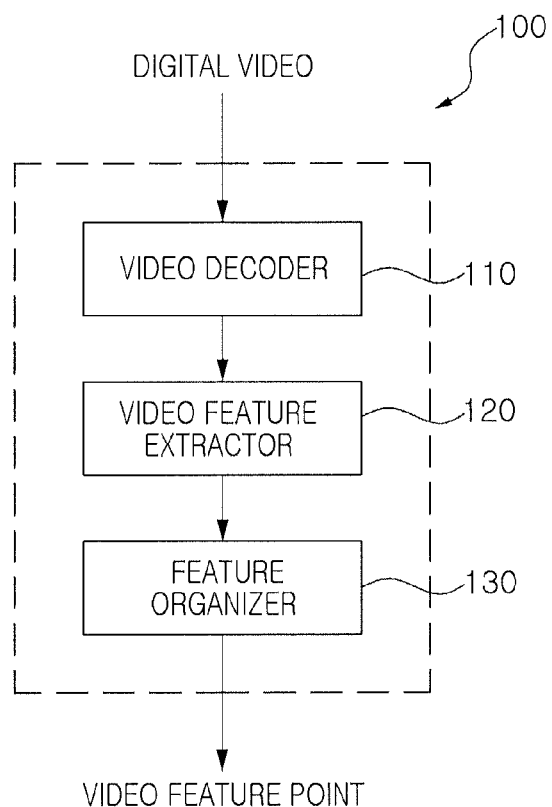
FIG. 2 is a schematic block diagram of a video feature point extractor according to an exemplary embodiment of the present invention.

FIG. 2 is a schematic block diagram of a video feature point extractor according to an exemplary embodiment of the present invention.

With reference to FIG. 2, the video feature point extractor 100 includes a video decoder 110, a video feature extractor 120, and a feature organizer 130. The video feature point extractor 100 may extract feature points of all the digital video which have been compressed by various coders.

In general, the digital videos are compressed by various coders, and the video decoder 110 decodes digital videos compressed by various coders to acquire video frames in the form before the digital videos were compressed.

Then, the video feature extractor 120 extracts feature points of the coded frames, and the feature organizer 130 organizes the feature points which have been extracted by the video feature extractor 120 to allow the video feature point comparator 300 to detect a section in which repeated content is present at a faster speed. This will now be described in detail with reference to FIGS. 3 and 4.

Figure 3:
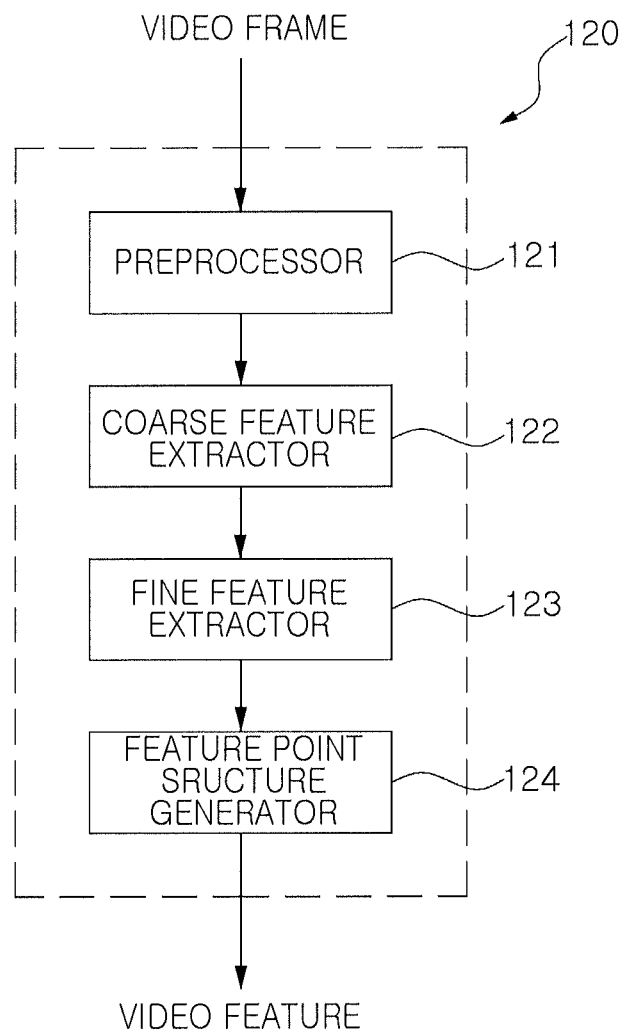
FIG. 3 is a schematic block diagram of a video feature extractor according to an exemplary embodiment of the present invention.

FIG. 3 is a schematic block diagram of a video feature extractor according to an exemplary embodiment of the present invention.

With reference to FIG. 3, the video feature extractor 120 includes a preprocessor 121, a coarse feature extractor 122, a fine feature extractor 123, and a feature point structure generator 124. The video feature extractor 120 receives decoded video frames and extracts feature points thereof.

The preprocessor 121 normalizes the size and color of the decoded video frames in consideration of the fact that the video frames may have information regarding various sizes and colors.

The coarse feature extractor 122 and the fine feature extractor 123 receive the normalized frames and extract coarse features and fine features of each frame. In this case, the coarse feature extractor 122 divides the normalized frames into relatively large units and extracts feature values of each of the divided areas, and the fine feature extractor 123 divides the normalized frames into relatively small units and extracts feature values of each of the divided areas. In this case, the feature values may be average values or primary or secondary differentiated values of the respective areas, and in this case, the average vales may be acquired through comparison with values of other areas, and the primary or secondary values may be acquired by comparing the values themselves and values of other areas of the values. In this case, the comparison areas may be generated through synthesizing with other areas.

The feature point structure generator 124 organizes the coarse feature information and fine feature information extracted through the coarse feature extractor 122 and the fine feature extractor 123, and generates feature points which may have a form that can be quickly compared with a reduced data capacity.

Figure 4:
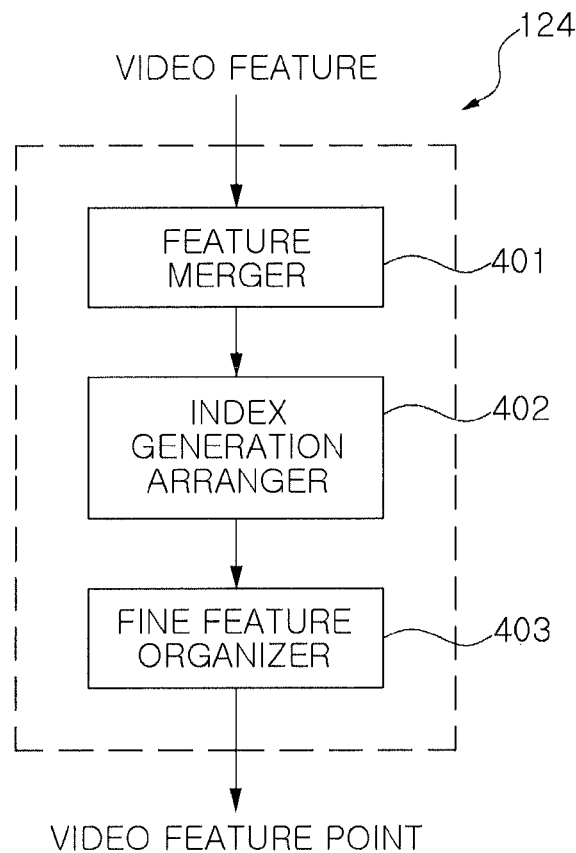
FIG. 4 is a schematic block diagram of a feature point structure generator according to an exemplary embodiment of the present invention.

FIG. 4 is a schematic block diagram of a feature point structure generator according to an exemplary embodiment of the present invention.

With reference to FIG. 4, the feature point structure generator 124 includes a feature merger 401, an index generation arranger 402, and a fine feature organizer 403. The feature point structure generator 124 organizes the coarse feature information and the fine feature information extracted through the coarse feature extractor 122 and the fine feature extractor 123.

The feature merger 401 compares and analyzes the coarse features acquired through the coarse feature extractor 122 by frame and merges frames having similar information into a single frame.

The index generation arranger 402 extracts an index with respect to the frames merged by the feature merger 401.

The fine feature organizer 403 organizes the number of fine features included in the feature points according to the number of the frames merged by the feature merger 401. For example, when a large number of coarse features are merged, the fine feature organizer 403 includes a large number of fine features in the feature points, and when a small number of coarse features are merged, the fine feature organizer 403 includes a small number of fine features in the feature points. This aims to stably guarantee the reliability of searching.

Figure 5:
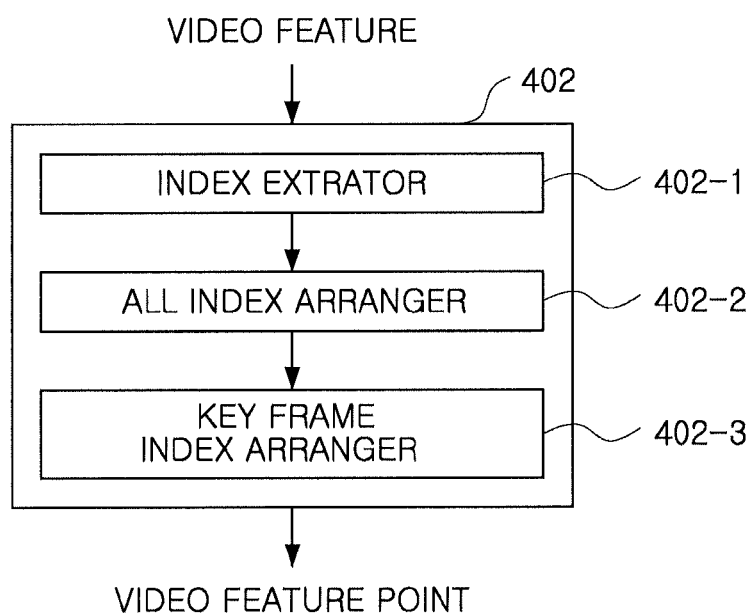
FIG. 5 is a schematic block diagram of an index generation arranger according to an exemplary embodiment of the present invention.

FIG. 5 is a schematic block diagram of an index generation arranger according to an exemplary embodiment of the present invention.

With reference to FIG. 5, the index generation arranger 402 includes an index extractor 402-1, an entire index organizer 402-2, a key frame index organizer 402-3, and the like. The index generation arranger 402 receives information regarding the video feature extractor 120 and extracts information regarding an index to organize the same to have such a form as to be quickly searched.

The index extractor 402-1 selects bits or values resistant to various video deformation from the video feature points extracted by the video feature extractor 120 and combines them to thus configure information regarding the index.

The entire index organizer 402-2 extracts information regarding every frame from the video feature points extracted by the video feature extractor 120 and then generates an entire frame index table by using the extracted information.

The key frame index organizer 402-3 extracts position information of a key frame with respect to every frame from the video feature points extracted by the video feature extractor 120, and then generates a key frame index table by using the extracted information. In this case, the key frame may be extracted through a key frame extraction algorithm that is able to support reproducibility of a frame.

A plurality of indexes may be generated through the entire index organizer 402-2 and the key frame index organizer 402-3, and when there is an N-bit index, it may be configured as N/M bits, respectively, to configure M number of indexes. The thusly generated indexes are stored in an index table in which the positions of respective indexes are stored.

Figures 6, 7:
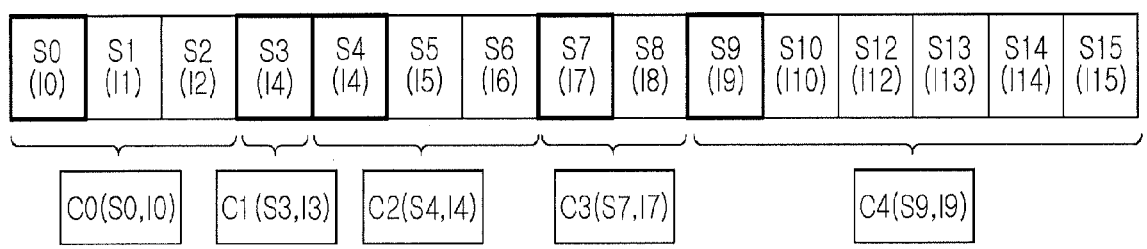
FIG. 6 is a view illustrating an example of an index table according to an exemplary embodiment of the present invention.
FIG. 7 is a view illustrating an operational example of the feature point structure generator according to an exemplary embodiment of the present invention.

FIG. 6 is a view illustrating an example of an index table according to an exemplary embodiment of the present invention.

With reference to FIG. 6, if the index of the first frame is '01001101', a corresponding index is shown in the corresponding position '01001101' of the index table. Other frames are constructed by using the same method. And a key frame index table is constructed by using the same method, also.

Figures 8, 9:
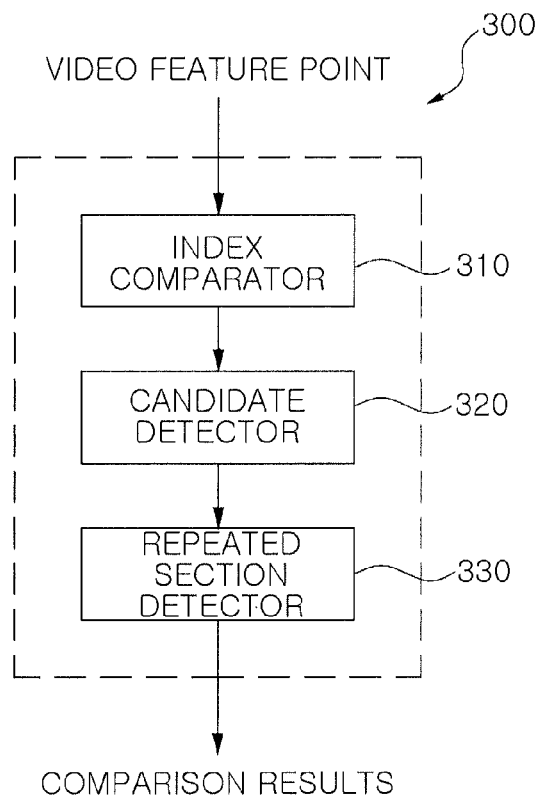
FIG. 8 is a view illustrating an operational example of a fine feature organizer according to an exemplary embodiment of the present invention.
FIG. 9 is a schematic block diagram of a video feature point comparator according to an exemplary embodiment of the present invention.

FIG. 7 is a view illustrating an operational example of the feature point structure generator according to an exemplary embodiment of the present invention. FIG. 8 is a view illustrating an operational example of the fine feature organizer according to an exemplary embodiment of the present invention.

In FIGS. 7 and 8, 'S' indicates a coarse feature, 'I' indicates an index, 'C' indicates a merged coarse feature, and 'F' indicates a fine feature.

First, with reference to FIG. 7, the feature point structure generator 124 comparatively analyzes the coarse features acquired by the coarse feature extractor 122 by frame, and merges frames having similar information into one frame. Namely, the feature point structure generator 124 may merge S0 to S2 into C0, S3 into C3, S4 to S6 into C2, S7 and S8 into C3, and S9 to S16 into C4. In this case, the merged coarse feature (e.g., C0) may have an index (I) for the purpose of fast searching. This index informs about from which position a corresponding merged coarse feature has come.

As shown in FIG. 8, the number of fine features is actively adjusted according to the number of the coarse features. Namely, as mentioned above, when a large number of coarse features are merged, a large number of fine features are adjusted to be included in the feature point, and when a small number of coarse features are merged, a small number of fine features are adjusted to be included in the feature point.

FIG. 9 is a schematic block diagram of the video feature point comparator according to an exemplary embodiment of the present invention.

With reference to FIG. 9, the video feature point comparator 300 includes an index comparator 310, a candidate detector 320, and a repeated section detector 330. The video feature point comparator 300 comparatively searches for the feature points of an input video and a corresponding comparison target video to acquire a section having the same content as that of the comparison target video (or the section of the comparison target video having the same content as that of the input video) and output the same.

Figure 10:
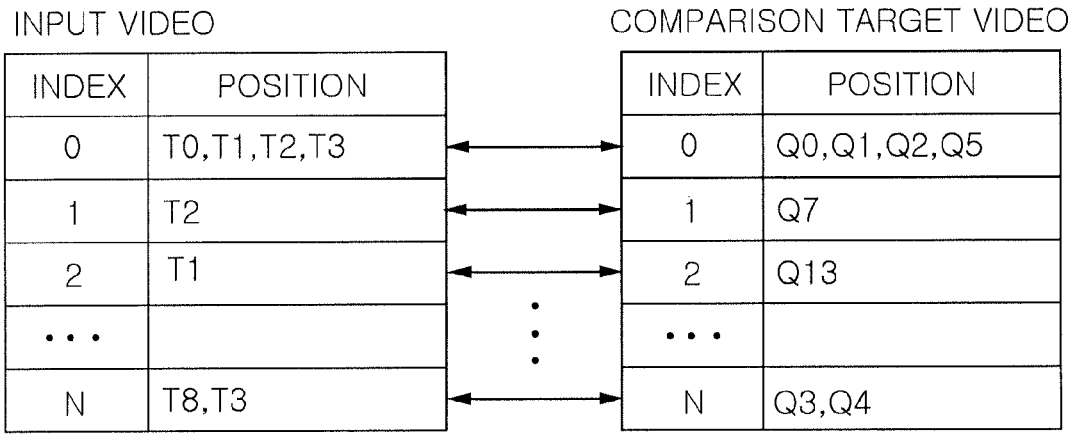
FIG. 10 is a view illustrating an operational example of an index comparator according to an exemplary embodiment of the present invention.

As shown in FIG. 10, the index comparator 310 stores the positions of the indexes included in the feature points of the input video and those of the indexes included in the feature points of the comparison target video and recognizes feature points in the positions having the same index.

The index comparator 310 comprise a comparison mode between key frame index tables, a comparison mode between a key frame index table and an entire frame index table, and a comparison mode between entire frame index tables, select one of the three comparison modes according to the length of a digital video desired to be searched, an accuracy and a speed, and process comparison operation by using the selected mode. The index comparator 310 is able to select one comparison mode in order of a comparison mode between key frame index tables, a comparison mode between a key frame index table and an entire frame index table, and a comparison mode between entire frame index tables in proportion to the length and the speed. However, the index comparator 310 is able to select one comparison mode in order of a comparison mode between key frame index tables, a comparison mode between a key frame index table and an entire frame index table, and a comparison mode between entire frame index tables in inverse proportion to the accuracy (for example, above 1 min, above 30 sec, above 2 sec).

Figure 11:
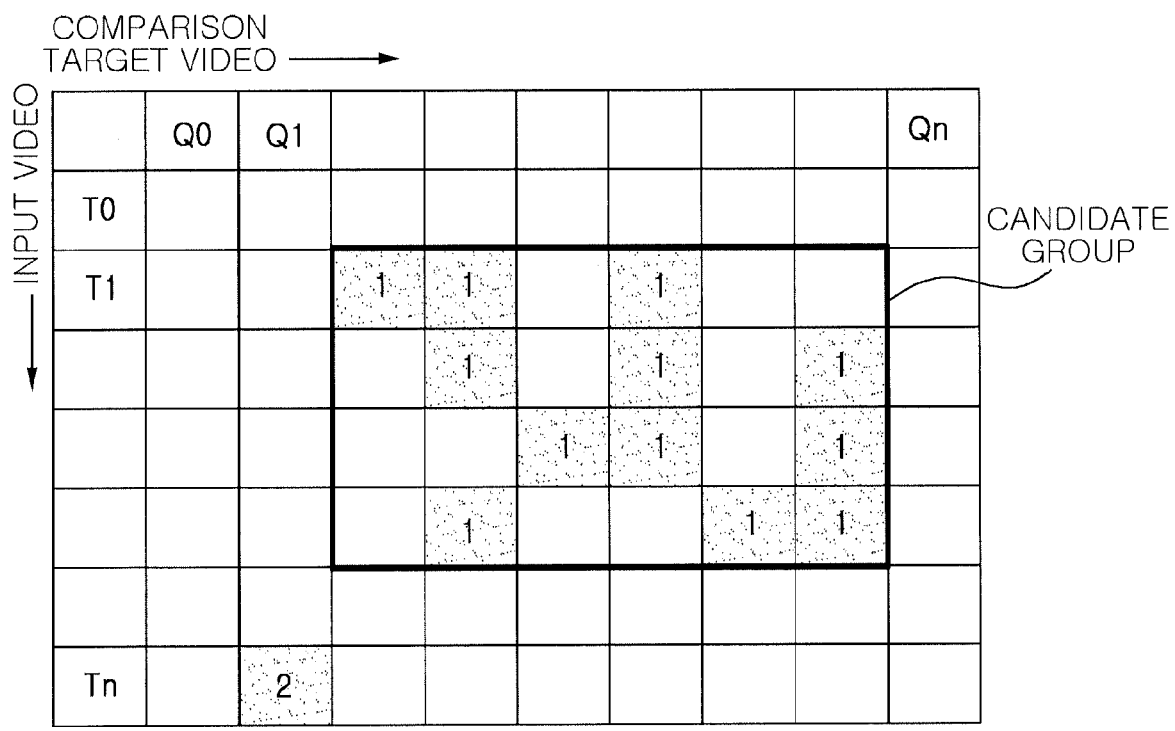
FIG. 11 is a view illustrating an operational example of a candidate detector according to an exemplary embodiment of the present invention.

FIG. 11 is a view illustrating an operational example of a candidate detector according to an exemplary embodiment of the present invention, in which positions of indexes are stored in the feature point structure generator, and only the feature points of the positions having the same index value are compared. Index matching is performed by comparing the feature points of positions where the same index is present. Matching by index allows for a faster comparison by limiting the feature point frames to be matched. In this case, when a plurality of index tables exist, how many indexes of each frame are to be matched may be set by a threshold value. Also, three types of matching structures, namely, matching between key frame index tables, matching between a key frame index table and an entire frame index table, and matching between entire frame index tables, may be selectively used according to the length of a digital video desired to be searched. The area of the thusly extracted candidate group is verified by the candidate detector 320. As shown in FIG. 11, the candidate detector 320 connects the feature points of the positions having the same index, and when a larger number of areas than a pre-set value are connected, the candidate detector 320 detects the corresponding areas as a candidate group. In this case, the connected portions may be analyzed through an analysis algorithm according to a known technique such as an area division, an area extension, and the like.

The repeated section detector 330 additionally compares the fine features of the detected candidate group to determine how similar the content of the input video and that of the comparison target video are. According to the determination, when the similarity degree of the currently detected candidate group is higher than a pre-set value, the repeated section detector 330 acquires the currently detected candidate group as a section having repeated content, and outputs the same. Namely, the repeated section detector 330 additionally analyzes the fine features of the candidate group and detects a section of the input video having the same content as that of the comparison target video (or the section of the comparison target video having the same content as that of the input video).

For reference, the similarity of the content of the input video and that of the comparison target video may be calculated through a Hamming distance detection algorithm, and any other detection algorithm may be applied according to the types of feature points.

As set forth above, according to exemplary embodiments of the invention, the digital video managing and searching system performs management and searching operation by using feature points that may represent a digital video, rather than the value of the digital video itself, although digital vides have various sizes and are different in their standards or intentionally or unintentionally modified, the digital videos can be smoothly managed and searched. Thus, the digital video managing and searching system according to exemplary embodiments of the invention can be applicable to various multimedia services.

In addition, feature points of a digital video are extracted, reorganized such that they can be easily searched, thus acquiring feature points. Therefore, the search capacity can be reduced and content can be quickly and accurately searched.

While the present invention has been shown and described in connection with the exemplary embodiments, it will be apparent to those skilled in the art that modifications and variations can be made without departing from the spirit and scope of the invention as defined by the appended claims.

What is claimed is:

1. A system for managing and searching for a digital video, the system comprising:
a video feature point extraction unit decoding an input video and extracting a feature point;
a video feature point database (DB) storing and managing a feature point of a comparison target video; and
a video feature point comparison unit coarsely comparing the feature point of the input video and that of the comparison target video to acquire a candidate group, and minutely comparing the candidate group to detect a content repeated section, and informing a user of the content repeated section,
wherein the video feature point extraction unit comprises:
a coarse feature extractor receiving input video and outputting coarse features;
a fine feature extractor receiving the input video and outputting fine features; and
a feature point structure generator generating feature points from the coarse features and the fine features,
wherein the feature point structure generator comprises:
a feature merger merging frames based on the coarse features;
an index generation arranger extracting an index of the frames which have been merged by the feature merger; and
a fine feature organizer organizing the number of fine features to be included in the feature points according to the number of the frames which have been merged by the feature merger,
wherein the index generation arranger comprises:
an index extractor selecting bits or values resistant to various video deformation from the video feature points extracted by the video feature extractor and combining them to configure information regarding the index;
an entire index organizer extracting information regarding every frame from the video feature points extracted by the video feature extractor to generate an entire frame index table; and
a key frame index organizer extracting position information of a key frame with respect to every frame from the video feature points extracted by the video feature extractor to generate a key frame index table,
wherein the video feature point comparator comprises:
an index comparator comparing the feature points of the input video an those of the comparison target video to recognize feature points having the same index;
a candidate detector detecting a candidate group by connecting the feature points; and
a repeated section detector analyzing fine features of the candidate group to detect a section of the input video having the same content as that of the comparison target video.

2. The system of claim 1, wherein the candidate detector selectively uses three types of matching structures of matching between key frame index tables, matching between a key frame index table and an entire frame index table, and matching between entire frame index tables, according to the length of a digital video.

* * * * *